United States Patent [19]
Nakase et al.

[11] Patent Number: 5,694,204
[45] Date of Patent: Dec. 2, 1997

[54] DEVICE FOR OPTICALLY MEASURING DISTANCE

[75] Inventors: Shigeki Nakase; Shigeyuki Nakamura; Hiromi Shimano, all of Hamamatsu, Japan

[73] Assignee: Hamamatsu Photonics K.K., Shizuoka-ken, Japan

[21] Appl. No.: 536,354

[22] Filed: Sep. 29, 1995

[30] Foreign Application Priority Data

Oct. 3, 1994 [JP] Japan .................. 6-239127

[51] Int. Cl.$^6$ .................................................. G01C 3/08
[52] U.S. Cl. ................................ 356/5.15; 356/5.1
[58] Field of Search ............................ 356/5.1–5.15

[56] References Cited

U.S. PATENT DOCUMENTS

| | | | |
|---|---|---|---|
| 2,982,167 | 5/1961 | Friden et al. | 356/5.15 |
| 4,413,904 | 11/1983 | Hamada et al. | 356/5.15 |
| 4,935,616 | 6/1990 | Scott | 356/5.15 |
| 4,957,362 | 9/1990 | Peterson | 356/5.15 |
| 5,164,733 | 11/1992 | Nettleton et al. | 356/5.11 |

FOREIGN PATENT DOCUMENTS 4-3373  1/1992  Japan ................ G01S 13/10

Primary Examiner—Stephen C. Buczinski
Attorney, Agent, or Firm—Sughrue, Mion, Zinn, Macpeak & Seas, PLLC

[57] ABSTRACT

In a device 100 for measuring distance, a signal generating circuit 20 generates a driving signal. The driving signal is serially modulated in phase into at least three states. The signal generating circuit 20 further generates reference signals having frequencies the same as the driving signal. A light source 30 is driven by the driving signal to emit detection light which is time-divisionally modulated in phase in accordance with the driving signal. An optical detector 40 receives the detection light which has been emitted from the light source 30 and scattered and reflected by the target. The optical detector 40 generates a detection signal which is time-divisionally modulated in phase in accordance with the received detection light. Homodyne processing circuits 50 and 60 superimpose the detection signal and the reference signals to generate homodyne signals (interference signals). Temporal mean values of intensities of the homodyne signals are obtained. A gain controlling circuit 80 feed-back controls the gains in the circuits 50 and 60. A phase detecting circuit 70 measures the temporal mean values of intensities of the homodyne signals, and calculates a difference between a phase of the detection light emitted from the light source and a phase of the detection light received at the optical detector.

16 Claims, 3 Drawing Sheets

DEVICE FOR OPTICALLY MEASURING DISTANCE

BACKGROUND OF THE INVENTION

1. Field of the Invention

The present invention relates to a device for optically measuring a distance to a target.

2. Description of the Related Art

A device for optically measuring a distance to a target is generally constructed from a light source for emitting a detection light to a target and an optical detector for receiving the detection light which is scattered by and reflected at the target. The device calculates the distance to the object, based on a difference between a phase of the detection light at the light source and a phase of the detection light at the optical detector. Because there are no optical detectors that can accurately trace the frequency of light, which can be as high as about 100 THz, it is impossible to directly measure the above-described phase difference.

A heterodyne technique is conventionally applied for indirectly detecting the phase difference. Upon receiving the detection light, the optical detector outputs a detection signal. The detection signal is superimposed with a reference signal that has a frequency slightly different from the detection signal, whereby an interference signal is generated. The frequency of the interference signal is equal to the difference between the frequencies of the detection signal and of the reference signal and therefore is very small relative to the frequency of the detection signal. The phase of the interference signal can therefore be directly measured. The phase of the detection signal is then calculated based on the measured phase of the interference signal and the preset phase of the reference signal, which is set to a predetermined value. Thus, it is possible to accurately measure the difference between the phase of the detection light at the light source and the phase of the detection light at the optical detector.

However, the phase difference can only be measured accurately when the detection signal and the reference signal have a stable frequency. Because the light source is driven by a drive signal supplied from an oscillator, the oscillator has to be structured to oscillate in a highly stable manner. Another oscillator provided for generating the reference signal also must be capable of oscillating in a highly stable manner.

These requirements to the oscillators are unnecessary with a homodyne technique, wherein the detection signal and the reference signal superimposed thereon have the same frequency with the detection signal. A generated interference signal has a mean or average intensity over a predetermined duration of time that corresponds to difference in phase of the reference signal, which is a fixed value, and the detection signal. The mean or average intensity of the interference signal is measured, and the phase of the detection signal is calculated based on the measured result and the phase of the reference signal. The device can therefore measure, with high accuracy, the difference between the phase of the detection light at the light source and the phase of the detection light at the optical detector.

Because the temporal mean intensity of the interference signal is determined based on a direct-current component of the interference signal, when the temporal mean intensity varies, it is difficult to judge whether this change is due to change in amplitude of the detection signal or due to change in phase of the detection signal. To eliminate the influences of the amplitude, a phase shift method can be employed, wherein the detection signal is superimposed on two reference signals which are different in phase, whereby two interference signals are obtained. A ratio of the temporal mean intensities of the two interference signals is measured, based on which the phase of the detection signal is calculated.

When the phase shift method is applied to the homodyne technique, however, because the temporal mean intensity of the interference signal is determined based on the direct-current component of the interference signal, the measuring accuracy greatly suffers from gain error, including offset error in an amplifier provided for amplifying the signals. Accordingly, the amplifier necessarily has a relatively broad dynamic range. That is, the amplifier must be designed with a fixed gain over the range anticipated for the temporal mean of the interference signal intensity.

In order to solve this problem, Japanese Utility Model Application Publication No. 4-3373 discloses a radio distance measuring device. This device transmits microwaves to a target, and receives the microwaves scattered by and reflected from the target. This device calculates the distance to the target, based on time required for the microwave to travel from the device to the object and back to the device. The device employs the homodyne technique. A phase shifter is provided for changing the phase of a reference signal depending on the level of a detection signal to adjust the intensity of an interference signal to a proper level. The phase shifter serves as a gain-variable amplifier for amplifying the interference signal with a gain controlled depending on the detection signal level.

SUMMARY OF THE INVENTION

In this device, however, when the phase of the reference signal is changed or switched, a low frequency component is generated synchronously with the switching operation. This low frequency component greatly influences the temporal mean of the interference signal intensity. To eliminate the influence of this low frequency component, a complicated and expensive signal processing circuit is required to either switch the phase of the reference signal in steps or change the frequency of the reference signal in sweeps.

It is therefore, an object of the present invention to overcome the above-described drawbacks, and to provide an improved device for optically measuring a distance to a target with high accuracy, with a simple structure and with using the homodyne technique employed with the phase shift method.

In order to attain the above object and other objects, the present invention provides a device for optically measuring a distance to a target, comprising: a signal generating circuit for generating a driving signal which is time-divisionally modulated in phase into at least three states and for generating an original reference signal having a frequency the same as the driving signal; a light source for being driven by the driving signal to emit detection light which is time-divisionally modulated in phase in accordance with the driving signal; an optical detector for receiving the detection light which has been emitted from the light source and scattered and reflected by the target and for generating a detection signal which is time-divisionally modulated in phase in accordance with the received detection light; a homodyne processing circuit for superimposing the detection signal and the original reference signal to obtain an interference signal and for generating a homodyne signal indicative of a temporal mean value of intensity of the interference signal; and a phase detecting circuit for comparing pulse heights of the homodyne signal obtained synchronously with the switching operation of the phase of the driving signal, thereby calculating a phase difference between a phase of the detection light emitted from the light source and a phase of the detection light received at the optical detector.

According to another aspect, the present invention provides a device, for optically measuring a distance to a target, comprising: a signal generating circuit for generating a driving signal, with its phase being serially changed into at least zero and $\pi/2$, and for generating an original reference signal having a frequency the same as the driving signal; a light source for being driven by the driving signal to emit detection light, with its phase being serially changed into at least zero and $\pi/2$ in accordance with the driving signal; an optical detector for receiving the detection light which has been emitted from the light source and scattered and reflected by the target and for generating a detection signal, with its phase being serially changed into at least $\beta$ and $\beta+\pi/2$ in accordance with the received detection light, where $\beta$ indicates the distance along which the detection light travels from the light source to the optical detector via the target; a homodyne processing circuit for superimposing the detection signal and the original reference signal to obtain a homodyne interference signal with its direct-current component indicating a temporal mean value of intensity of the homodyne interference signal; and a distance measuring circuit for comparing values of the direct-current components of the homodyne interference signal synchronously with the switching operation of the phase of the driving signal, and for calculating, based on the compared result, the distance along which the detection light travels from the light source via the target to the optical detector.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PRESENT INVENTION

Figure 1:
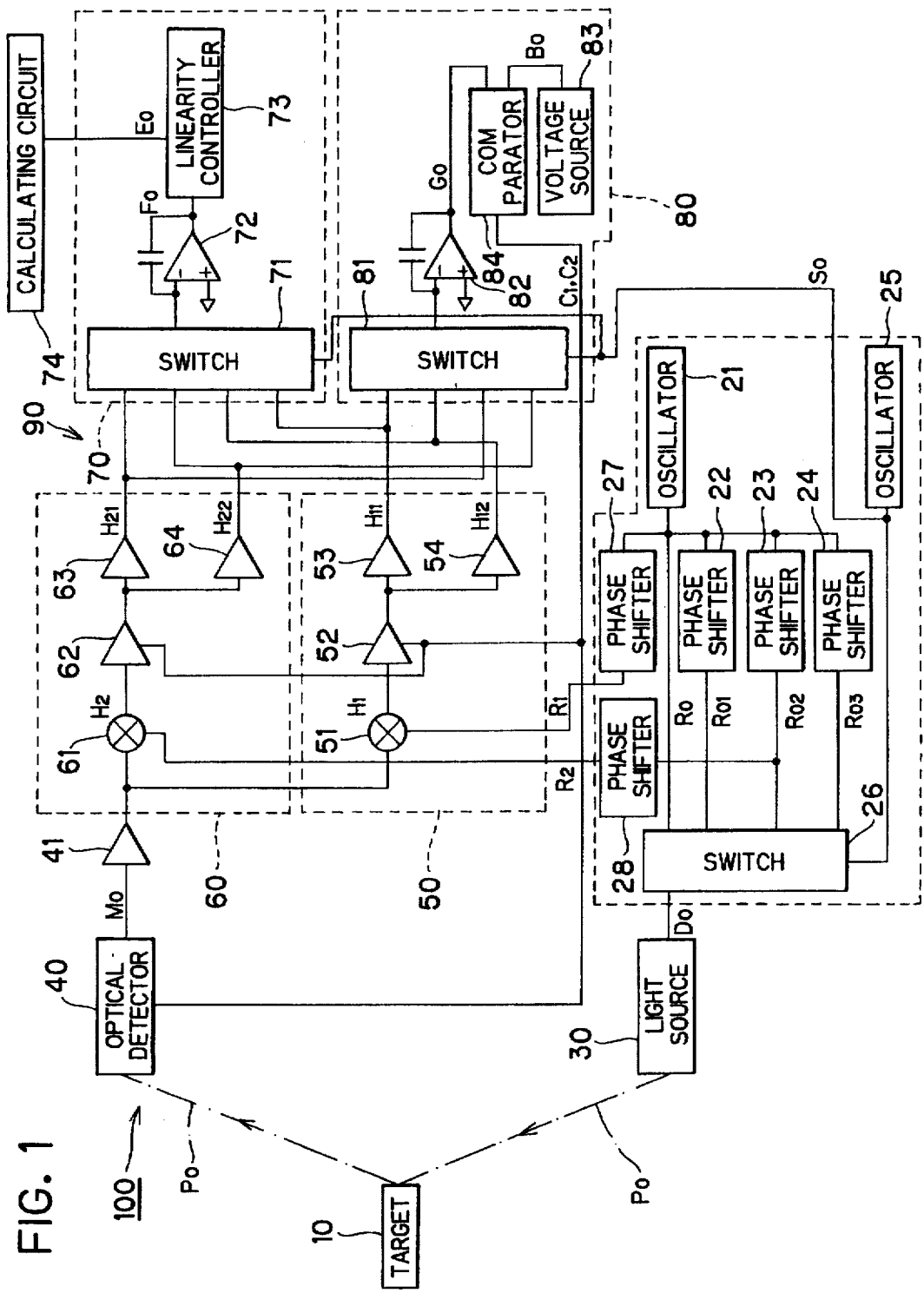
FIG. 1 is a block diagram showing a circuit configuration of a device for optically measuring distance of a preferred embodiment according to the present invention.

First will be given the principle of the device of the present invention for optically measuring a distance to a target.

According to the present invention, a driving signal for driving a light source is serially modulated in phase. Now assume that the driving signal is a sine wave with the frequency $f_0$ and therefore is expressed by the following complex notation: $A_0\exp[i(2 \pi f_0 t)]$. In the present specification, for simplicity and clarity, the driving signal will be indicated by the following expression: $A_0\sin(2 \pi f_0 t)$. The light source is driven to emit a detection light in accordance with the driving signal. The detection light travels to a target, and is scattered by and reflected at the target. The detection light then travels from the target toward the optical detector. When the detection light arrives at the optical detector, the optical detector produces a detection signal. The detection signal can be expressed by the following complex notation: $A_1\exp[i(2 \pi f_0 t+\beta)]$, where $\beta=2 \pi f_0 (L/c)$, L is the distance between the light source and the optical detector via the target, and c is the speed of the light. In this specification, for simplicity and clarity, the detection signal will be indicated by the following expression: $A_1\sin(2 \pi f_0 t+\beta)$.

Because the present invention employs the homodyne technique, the detection signal is superimposed with a reference signal having the same frequency $f_0$ with the detection signal. The reference signal is expressed by the following complex notation: $A_2\exp[i(2 \pi f_0 t)]$, for example. The reference signal will now be indicated by the following expression: $A_2\sin(2 \pi f_0 t)$. A homodyne signal $V_1$ (interference signal) expressed by the following equation is therefore generated.

$$V_1 = A_2\sin(2\pi f_0 t) \cdot A_1\sin(2\pi f_0 t + \beta) = A_2 A_1 \cos\beta -$$
$$A_2 A_1 \cos\beta \cos^2(2\pi f_0 t) + A_2 A_1 \sin(2\pi f_0 t) \cdot \cos(2\pi f_0 t) \cdot \sin\beta$$

This homodyne signal $V_1$ (which will be referred to as a "first homodyne signal" hereinafter) is supplied to, for example, an integrator, where high-frequency components are eliminated, and a direct-current component (which will be referred to as a "first direct-current component" hereinafter) $D_1$ is obtained. The direct-current component $D_1$ is indicated by the following expression: $A_2 A_1 \cos\beta$. The direct-current component represents a temporal mean of the intensity of the homodyne signal.

According to the present invention, the phase of the driving signal is serially changed. For example, the phase of the driving signal is serially changed into zero and $\pi/2$. When the phase of the driving signal is zero, the above-described first homodyne signal $V_1$ is generated. When the phase of the driving signal is $\pi/2$, a second homodyne signal $V_2$ expressed by the following equation is generated.

$$V_2 = A_2\sin(2\pi f_0 t) \cdot A_1\sin\{2\pi f_0 t + \beta + (\pi/2)\} = -A_2 A_1 \sin\beta -$$
$$A_2 A_1 \sin\beta \cos^2(2\pi f_0 t) + A_2 A_1 \sin(2\pi f_0 t) \cdot \cos(2\pi f_0 t) \cdot \cos\beta$$

Thus, as the driving signal is serially modulated into 0 and $\pi/2$, the homodyne signals $V_1$ and $V_2$ are serially obtained. As apparent from the above expression, the direct-current component of the homodyne signal $V_2$ (referred to as a "second direct-current component $D_2$") is indicated by the following expression: $-A_2 A_1 \sin\beta$. By supplying the homodyne signals $V_1$ and $V_2$ to integrators, for example, the first and second direct-current components $D_1$ and $D_2$ are obtained. A ratio between the direct-current components is calculated. Because the ratio equals $-\tan\beta$, the phase value $\beta$ is calculated. The distance value L is then calculated.

The phase of the driving signal can be further shifted into $\pi$, for example, whereupon a third homodyne signal expressed by the following equation is generated.

$$V_3 = A_2\sin(2\pi f_0 t) \cdot A_1\sin\{2\pi f_0 t + \beta + \pi\} \cdot = -A_2 A_1 \cos\beta +$$
$$A_2 A_1 \cos\beta \cos^2(2\pi f_0 t) - A_2 A_1 \sin(2\pi f_0 t) \cdot \cos(2\pi f_0 t) \cdot \sin\beta$$

As the phase of the driving signal is serially changed into zero, $\pi/2$, and $\pi$, the homodyne signals $V_1$, $V_2$, and $V_3$ are generated. As apparent from the above expression, the direct-current component of the homodyne signal $V_3$ (referred to as a "third direct-current component $D_3$") is expressed by $-A_2 A_1 \cos\beta$. By supplying the homodyne signal $V_3$ to an integrator, for example, the third direct-current component $D_3$ can be obtained. It is possible to eliminate any offset voltages occurred in the homodyne signals $V_1$ and $V_3$, by subtracting the direct-current component $D_3$ from the direct-current component $D_1$. The value $\beta$ can be accurately calculated based on the ratio of the component $D_2$ with regard to the difference between the components $D_1$ and $D_3$.

Alternatively, the driving signal can be temporarily switched into OFF state. It is also possible to eliminate any offset voltages from the first direct-current component $D_1$ by subtracting, from the component $D_1$, the direct-current component of a homodyne signal obtained during the driving signal is OFF. The value $\beta$ can be accurately calculated based on the ratio of the component $D_2$ with regard to the offset-corrected component $D_1$.

The phase of the driving signal can be further shifted into $3\pi/2$, whereupon a fourth homodyne signal expressed by the following equation is generated:

$$V_4 = A_2\sin(2\pi f_0 t) \cdot A_1\sin\{2\pi f_0 t + \beta + 3\pi/2\} = A_2 A_1 \sin\beta +$$

$$A_2 A_1 \sin\beta\cos^2(2\pi f_0 t) - A_2 A_1 \sin(2\pi f_0 t) \cdot \cos(2\pi f_0 t) \cdot \cos\beta$$

As the phase of the driving signal is serially changed into zero, $\pi/2$, $\pi$, and $3\pi/2$, the homodyne signals $V_1$, $V_2$, $V_3$, and $V_4$ are generated. As apparent from the above expression, the direct-current component of the homodyne signal $V_4$ (referred to as a "fourth direct-current component $D_4$") is indicated by the expression: $A_2 A_1 \sin\beta$. By supplying the homodyne signal $V_4$ to an integrator, for example, the direct-current component $D_4$ can be obtained. It is possible to eliminate any offset voltages occurred in the homodyne signals $V_2$ and $V_4$ by subtracting the component $D_4$ from the component $D_2$. It is possible to accurately calculate the value $\beta$ through calculating the ratio of the difference between the components $D_2$ and $D_4$ with regard to the difference between the components $D_1$ and $D_3$.

According to the present invention, as described above, the driving signal is time-divisionally modulated in phase. When a low-frequency component is generated synchronously with the phase switch of the driving signal, the low-frequency component is added to the driving signal. The light source emits detection light which includes the low-frequency component. While travelling, the detection light will attenuate with the low-frequency component at a predetermined rate. Because the low-frequency component is originally very small relative to the driving signal, and therefore very small relative to the detection light, an amount of the low-frequency component received by the optical detector will be small enough to be ignored. Thus, the detection signal obtained by the optical detector will be free from the low-frequency component.

Because the serially modulated homodyne signals are all supplied into the integrators, for example, in a single signal line, all the homodyne signals can be gain-controlled by a single gain-control circuit before being supplied to the integrators. It is possible to highly accurately maintain the ratio between the direct-current components of the homodyne signals.

Figure 2:
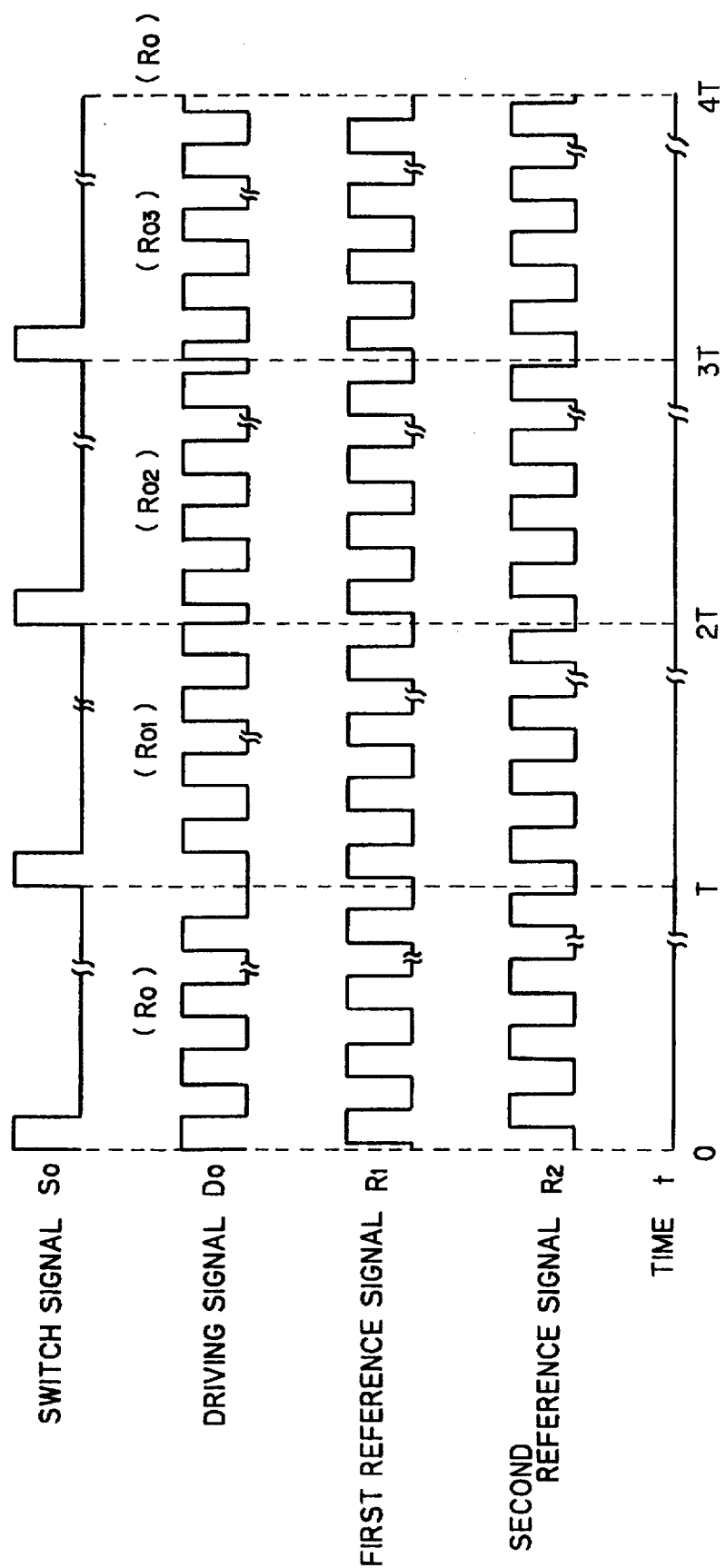
FIG. 2 is a timing chart showing various signals outputted from a signal generating circuit of FIG. 1.
Figure 3:
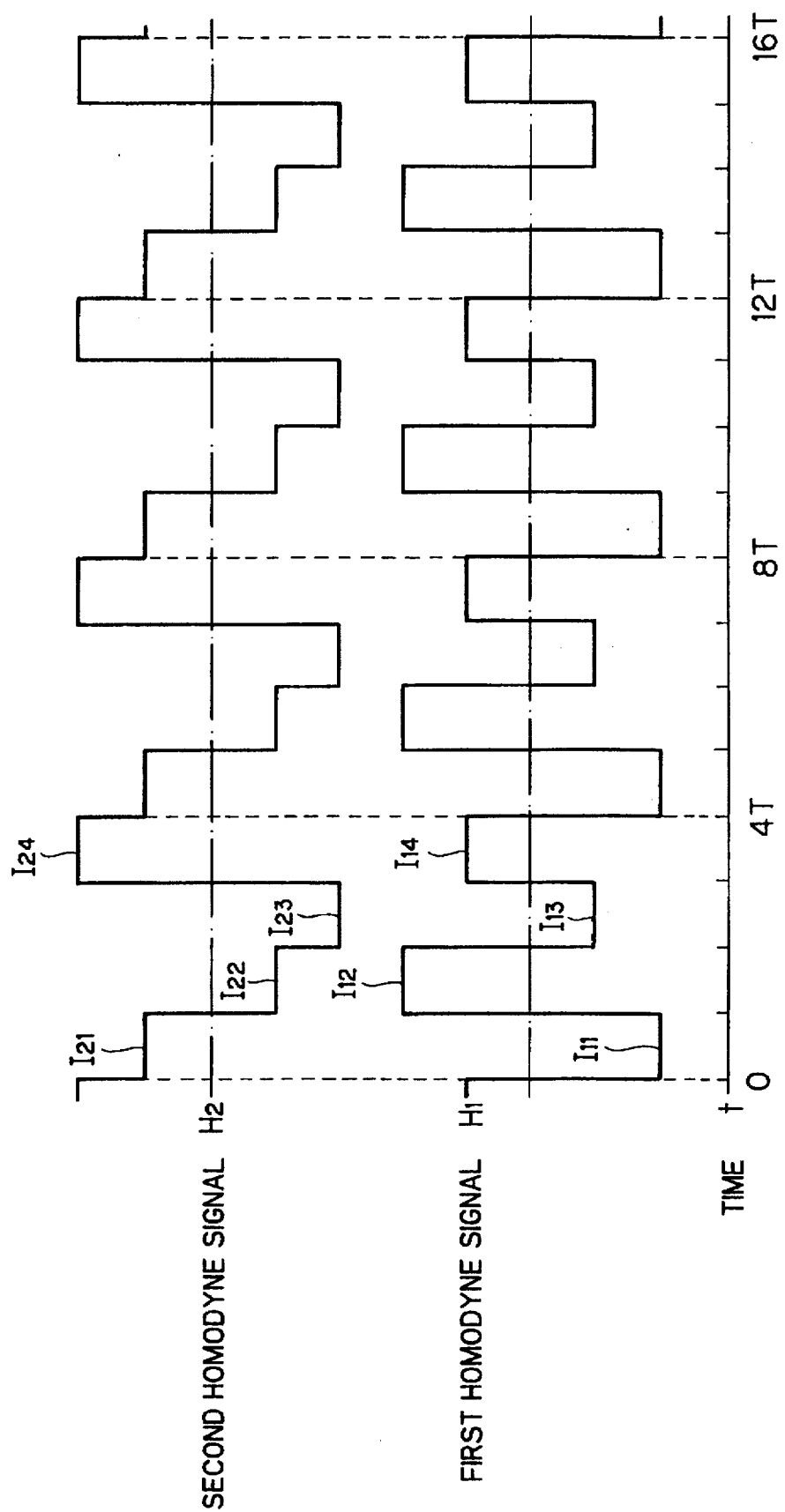
FIG. 3 is a timing chart showing homodyne signals produced by homodyne processing circuits.

A device for optically measuring distance according to a preferred embodiment of the present invention will be described while referring to the accompanying drawings wherein like parts and components are designated by the same reference numerals in FIGS. 1 through 3 to avoid duplicating description.

As shown in FIG. 1, the device 100 for optically measuring distance according to the embodiment mainly includes: a light source 30; an optical detector 40; and a signal processing portion 90. The light source 30 is for emitting a detection light toward a target 10. The optical detector 40 is for detecting the detection light which has been scattered by and reflected off the target 10. The signal processing portion 90 is for processing various signals inputted to and outputted from the light source 30 and the optical detector 40. In this example, the light source 30 is a light emitting diode for emitting detection light $P_0$ in correspondence with a driving signal $D_0$ supplied from the signal processing portion 90. The optical detector 40 is a photodiode for photoelectrically converting the received detection light $P_0$ into a detection signal $M_0$ and supplying the detection signal $M_0$ to the signal processing portion 90.

The signal processing portion 90 includes: a signal generating circuit 20 for controlling operations of the light source 30; a front amplifier 41; first and second homodyne processing circuits 50 and 60; a phase detecting circuit 70; and a gain adjusting circuit 80.

The signal generating circuit 20 includes: first and second oscillators 21 and 25; three phase shifters 22, 23 and 24; first and second additional phase shifters 27 and 28; and a first switch 26. The first oscillator 21 is for oscillating an original signal $R_0$. The oscillator 21 supplies the original signal $R_0$ to the first switch 26, the three phase shifters 22 through 24, and the first additional phase shifter 27. The original signal $R_0$ is of a rectangular waveform with a frequency $f_0$, a phase $\phi_0$, and an amplitude $A_0$. The original signal $R_0$ can therefore be approximated as a sine (or cosine) wave and can be expressed by the complex notation: $A_0\exp[i(2\pi f_0 t + \phi_0)]$. In the present specification, for simplicity and clarity, the original signal $R_0$ is expressed by the following equation (1):

$$R_0 = A_0 \sin(2\pi f_0 t + \phi_0) \tag{1}$$

where t is time.

The three phase shifters 22, 23, and 24 are for producing three phase-shifted original signals $R_{01}$, $R_{02}$, and $R_{03}$ by shifting the phase of the original signal $R_0$ by the amounts of $\pi$, $\pi/2$, and $3\pi/2$, respectively. The phase shifters 22, 23, and 24 supply those signals $R_{01}$, $R_{02}$, and $R_{03}$ to the first switch 26. The phase shifter 23 supplies the signal $R_{02}$ also to the second additional phase shifter 28. The signals $R_{01}$, $R_{02}$, and $R_{03}$ are therefore expressed by the following complex notations: $A_0\exp[i(2\pi f_0 t + \phi_0 + \pi)]$; $A_0\exp[i(2\pi f_0 t + \phi_0 + \pi/2)]$; and $A_0\exp[i(2\pi f_0 t + \phi_0 + 3\pi/2)]$. In the present specification, for simplicity and clarity, the signals $R_{01}$, $R_{02}$, and $R_{03}$ are expressed by the following equations (2), (3), and (4):

$$R_{01} = A_0 \sin(2\pi f_0 t + \phi_0 + \pi) \tag{2}$$

$$R_{02} = A_0 \sin(2\pi f_0 t + \phi_0 + \pi/2) \tag{3}$$

$$R_{03} = A_0 \sin(2\pi f_0 t + \phi_0 + 3\pi/2) \tag{4}$$

The second oscillator 25 is provided for oscillating a switch signal $S_0$. The oscillator 25 supplies the switch signal $S_0$ to the first switch 26, the phase detecting circuit 70, and the gain adjusting circuit 80. As shown in FIG. 2, the switch signal $S_0$ is a pulse signal oscillated at a period T. The period T is set to a value sufficiently longer than the periods ($1/f_0$) of the signals $R_0$, $R_{01}$, $R_{02}$, and $R_{03}$, which allows production of a driving signal $D_0$ from a successive series of signals $R_0$, $R_{01}$, $R_{02}$, and $R_{03}$ as described below.

The first switch 26 continuously receives signals $R_0$, $R_{01}$, $R_{02}$, and $R_{03}$. The switch 26 produces a driving signal $D_0$ shown in FIG. 2 by successively selecting one of the signals $R_O$, $R_{O1}$, $R_{O2}$, and $R_{O3}$ in correspondence with the switch signal $S_O$. The phase of the driving signal $D_O$ is therefore time-divisionally or serially modulated into four states of 0, $\pi$, $\pi/2$, and $3\pi/2$. The first switch 26 supplies the driving signal $D_O$ to the light source 30.

The first additional phase shifter 27 is for producing a first reference signal $R_1$ by shifting the phase of the original signal $R_O$ by the amount of a predetermined reference phase $\alpha$. The first additional phase shifter 27 supplies the signal $R_1$ to the first homodyne processing circuit 50. The signal $R_1$, which is shown in FIG. 2 and which is expressed by the which is expressed by the complex notation $A_O \exp[i(2\pi f_O t + \phi_1)]$, can be approximated by the following (5):

$$R_1 = A_O \sin(2\pi f_O t + \phi_1) \qquad (5)$$

where $\phi_1 = \phi_O + \alpha$.

The amount of the reference phase $\alpha$ is preset in accordance with an anticipated range, in which the distance to the target 10 will fall, so as to allow first and second homodyne signals $H_1$ and $H_2$ (as will be described later) to have sufficient pulse heights.

Similarly to the first additional phase shifter 27, the second additional phase shifter 28 is for producing a second reference signal $R_2$ by shifting the phase of the signal $R_{O2}$ also by the amount of the reference phase $\alpha$. The second additional phase shifter 27 supplies the signal $R_2$ to the second homodyne processing circuit 60. The signal $R_2$, which is shown in FIG. 2 and which is expressed by the complex notation $A_O \exp[i(2\pi f_O t + \phi_1 + \pi/2)]$, can be approximated by the following equation (6):

$$R_2 = A_O \sin(2\pi f_O t + \phi_1 + \pi/2) \qquad (6)$$

The light source 30 is driven by the driving signal $D_O$ to emit a detection light $P_O$ which is time-divisionally or serially modulated in phase in accordance with the driving signal $D_O$. The detection light $P_O$ is irradiated on the target 10, scattered and reflected by the target 10, and detected by the optical detector 40. The optical detector 40 is for generating a detection signal $M_O$ which is also time-divisionally or serially modulated in phase in correspondence with the phase of the detection light $P_O$. The gain of the optical detector 40 is variable by the gain adjusting circuit 80. The optical detector 40 supplies the detection signal $M_O$ to the front amplifier 41. The front amplifier 41 is for amplifying the amplitude of the signal $M_O$ and for supplying the amplified signal $M_O$ both to the first and second homodyne processing circuits 50 and 60.

The phase of the detection signal $M_O$ is shifted from the driving signal $D_O$ by the amount of $\beta$, which corresponds to the sum of the distance between the light source 30 and the target 10 and the distance between the target 10 and the optical detector 40. When originally emitted from the light source 30, the detection signal $D_O$ is a rectangular wave with an amplitude $A_O$ and is comprised of the successive series of four signals $R_O$, $R_{O1}$, $R_{O2}$, and $R_{O3}$ as shown in FIG. 2. Accordingly, the detection signal $M_O$ is a rectangular wave with an amplitude $A$, and is comprised of four successive signals which are expressed by the following complex notations: $A \exp[i(2\pi f_O t + \phi_2)]$; $A \exp[i(2\pi f_O t + \phi_2 + \pi)]$; $A \exp[i(2\pi f_O t + \phi_2 + \pi/2)]$; and $A \exp[i(2\pi f_O t + \phi_2 + 3\pi/2)]$ where $\phi_2 = \phi_O + \beta$. In the present specification, for simplicity and clarity, the four successive signals are expressed by the following expressions (7)–(10):

$$A \sin(2\pi f_O t + \phi_2) \qquad (7)$$

$$A \sin(2 f_O t + \phi_2 + \pi) \qquad (8)$$

$$A \sin(2\pi f_O t + \phi_2 + \pi/2) \qquad (9)$$

$$A \sin(2\pi f_O t + \phi_2 + 3\pi/2) \qquad (10)$$

The first homodyne processing circuit 50 includes a first multiplier 51, a gain-variable amplifier 52, and two amplifiers 53 and 54. The first multiplier 51 is for receiving the amplified detection signal $M_O$ and the first reference signal $R_1$ and for superimposing the signals $M_O$ and $R_1$ to produce an interference signal (referred to as a "first homodyne signal $H_1$"). The multiplier 51 supplies the signal $H_1$ to the first gain-variable amplifier 52 and then to the two amplifiers 53 and 54.

The first homodyne signal $H_1$ is comprised of a successive series of four interference signals V11 through V14, which are expressed by the following complex notations:

$(Ae^{i\phi_2} + A_O e^{i\phi_1})e^{i2\pi f_O t}$; $(Ae^{i(\phi_2 + \pi)} + A_O e^{i\phi_1})e^{i2\pi f_O t}$; $(Ae^{i(\phi_2 + \pi/2)} + A_O e^{i\phi_1})e^{i2\pi f_O t}$; and $(Ae^{i(\phi_2 + 3\pi/2)} + A_O e^{i\phi_1})e^{i2\pi f_O t}$.

For simplicity and clarity, the interference signals V11 through V14 are expressed by the following equations in this specification:

$V11 = A_O \sin(2\pi f_O t + \phi_1) \cdot A \sin(2\pi f_O t + \phi_2) = A_O A \cos(\phi_2 - \phi_1) -$ $A_O A \cos^2(2\pi f_O t + \phi_1) \cdot \cos(\phi_2 - \phi_1) + A_O A \sin(2\pi f_O t + \phi_1) \cdot$ $\cos(2\pi f_O t + \phi_1) \cdot \sin(\phi_2 - \phi_1)$ $V12 = A_O \sin(2\pi f_O t + \phi_1) \cdot A \sin(2\pi f_O t + \phi_2 + \pi) = -$ $A_O A \cos(\phi_2 - \phi_1) + A_O A \cos^2(2\pi f_O t + \phi_1) \cdot \cos(\phi_2 - \phi_1) -$ $A_O A \sin(2\pi f_O t + \phi_1) \cdot \cos(2\pi f_O t + \phi_1) \cdot \sin(\phi_2 - \phi_1)$ $V13 = A_O \sin(2\pi f_O t + \phi_1) \cdot A \sin(2\pi f_O t + \phi_2 + \pi/2) = -$ $A_O A \sin(\phi_2 - \phi_1) + A_O A \cos^2(2\pi f_O t + \phi_1) \cdot \sin(\phi_2 - \phi_1) +$ $A_O A \sin(2\pi f_O t + \phi_1) \cdot \cos(2\pi f_O t + \phi_1) \cdot \cos(\phi_2 - \phi_1)$ $V14 = A_O \sin(2\pi f_O t + \phi_1) \cdot A \sin(2\pi f_O t + \phi_2 + 3\pi/2) =$ $A_O A \sin(\phi_2 - \phi_1) - A_O A \cos^2(2\pi f_O t + \phi_1) \cdot \sin(\phi_2 - \phi_1) -$ $A_O A \sin(2\pi f_O t + \phi_1) \cdot \cos(2\pi f_O t + \phi_1) \cdot \cos(\phi_2 - \phi_1)$ As apparent from the above expressions, each of the interference signals V11 through V14 is constructed from high-frequency components and a direct-current component. The direct-current component is indicative of a temporal mean of the intensity of the corresponding signal. While each signal is fed through subsequent amplifiers 52, 53, and 54, the high-frequency components will be eliminated from the signal. When each signal is fed through an integrator 82 or 72, the high-frequency component will be completely eliminated from the signal, whereby only the direct-current component will be remained. Thus, it can be said that the multiplier 51 cooperates with the amplifiers 52–54 and the integrator 72 or 82 to provide a successive series of four pulse signals constructed from the direct-current components of the four interference signals V11–V14. In other words, the first homodyne signal $H_1$ is constructed from four pulses $I_{11}$, $I_{12}$, $I_{13}$ and $I_{14}$ which are serially generated at every time T as shown in FIG. 3. The pulse heights $I_{11}$, $I_{12}$, $I_{13}$ and $I_{14}$ are expressed by the following equations (11) through (14):

$$I_{11} = AA_O \cos(\phi_2 - \phi_1) \qquad (11)$$

$$I_{12} = -AA_O \cos(\phi_2 - \phi_1) \qquad (12)$$

$I_{13} = -AA_0 \sin(\phi_2 - \phi_1)$ (13)

$I_{14} = AA_0 \sin(\phi_2 - \phi_1)$ (14)

The first gain-variable amplifier 52 is for amplifying the first homodyne signal $H_1$ at a gain variably set by the gain adjusting circuit 80. The amplifier 52 supplies the amplified signal $H_1$ to the two amplifiers 53 and 54. The amplifier 53 is for maintaining the polarity of the amplified signal $H_1$ and for producing a polarity-maintained first homodyne signal $H_{11}$. The signal $H_{11}$ is comprised of the pulses of amplified pulse heights $I_{11}$, $I_{12}$, $I_{13}$, and $I_{14}$. The amplifier 53 supplies the signal $H_{11}$ to both the phase detecting circuit 70 and the gain adjusting circuit 80. The amplifier 54 is for reversing the polarity of the amplified signal $H_1$ and for producing a polarity-reversed first homodyne signal $H_{12}$. The signal $H_{12}$ is comprised of the pulses of amplified pulse heights $-I_{11}$, $-I_{12}$, $-I_{13}$, and $-I_{14}$. The amplifier 54 also supplies the signal $H_{12}$ to both the phase detecting circuit 70 and the gain adjusting circuit 80.

Similarly to the first homodyne circuit 50, the second homodyne processing circuit 60 includes a second multiplier 61, a gain-variable amplifier 62, and two amplifiers 63 and 64. The second multiplier 61 is for receiving the amplified detection signal $M_0$ and the second reference signal $R_2$ and for superimposing the signals $M_0$ and $R_2$ to produce an interference signal (referred to as a "second homodyne signal $H_2$"). The multiplier 61 supplies the signal $H_2$ to the first gain-variable amplifier 62 and then to the two amplifiers 63 and 64.

The second homodyne signal $H_2$ is comprised of a successive series of four interference signals V21 through V24, which are expressed by the following complex notations:

$(Ae^{i\phi_2} + A_0 e^{i(\phi_1 + \pi/2)})e^{i(2\pi f_0 t)}$; $(Ae^{i(\phi_2 + \pi)} + A_0 e^{i(\phi_1 + \pi/2)})e^{i(2\pi f_0 t)}$; $(Ae^{i(\phi_2 + \pi/2)} + A_0 e^{i(\phi_1 + \pi/2)})e^{i(2\pi f_0 t)}$; and $(Ae^{i(\phi_2 + 3\pi/2)} + A_0 e^{i(\phi_1 + \pi/2)})e^{i(2\pi f_0 t)}$.

In the present specification, for simplicity and clarity, the interference signals V21 through V24 are expressed by the following equations:

$V21 = A_0 \sin(2\pi f_0 t + \phi_1 + \pi/2) \cdot A \sin(2\pi f_0 t + \phi_2) =$ $A_0 A \sin(\phi_2 - \phi_1) - A_0 A \cos^2(2\pi f_0 t + \phi_1) \cdot \sin(\phi_2 - \phi_1) -$ $A_0 A \sin(2\pi f_0 t + \phi_1) \cdot \cos(2\pi f_0 t + \phi_1) \cdot \cos(\phi_2 - \phi_1)$ $V22 = A_0 \sin(2\pi f_0 t + \phi_1 + \pi/2) \cdot A \sin(2\pi f_0 t + \phi_2 + \pi) = -$ $A_0 A \sin(\phi_2 - \phi_1) + A_0 A \cos^2(2\pi f_0 t + \phi_1) \cdot \sin(\phi_2 - \phi_1) +$ $A_0 A \sin(2\pi f_0 t + \phi_1) \cdot \cos(2\pi f_0 t + \phi_1) \cdot \cos(\phi_2 - \phi_1)$ $V23 = A_0 \sin(2\pi f_0 t + \phi_1 + \pi/2) \cdot A \sin(2\pi f_0 t + \phi_2 + \pi/2) =$ $A_0 A \cos(\phi_2 - \phi_1) - A_0 A \cos^2(2\pi f_0 t + \phi_1) \cdot \cos(\phi_2 - \phi_1) +$ $A_0 A \sin(2\pi f_0 t + \phi_1) \cdot \cos(2\pi f_0 t + \phi_1) \cdot \sin(\phi_2 - \phi_1)$ $V24 = A_0 \sin(2\pi f_0 t + \phi_1 + \pi/2) \cdot A \sin(2\pi f_0 t + \phi_2 + 3\pi/2) = -$ $A_0 A \cos(\phi_2 - \phi_1) + A_0 A \cos^2(2\pi f_0 t + \phi_1) \cdot \cos(\phi_2 - \phi_1) -$ $A_0 A \sin(2\pi f_0 t + \phi_1) \cdot \cos(2\pi f_0 t + \phi_1) \cdot \sin(\phi_2 - \phi_1)$ As apparent from the above expressions, each of the interference signals V21 through V24 is constructed from high-frequency components and a direct-current component. The direct-current component is indicative of a temporal mean value of the intensity of the corresponding signal. While each signal is fed through subsequent amplifiers 62, 63, and 64, the high-frequency components will be eliminated from the signal. When each signal is fed through an integrator 82 or 72, the high-frequency component will be completely eliminated from the signal, whereby only the direct-current component will be remained. Thus, it can be said that the multiplier 61 cooperates with the amplifiers 62–64 and the integrator 72 or 82 to provide a successive series of four pulse signals constructed from the direct-current components of the four interference signals V21-V24. In other words, the second homodyne signal $H_2$ is constructed from four pulses $I_{21}$, $I_{22}$, $I_{23}$ and $I_{24}$ which are serially generated at every time T as shown in FIG. 3. The pulse heights $I_{21}$, $I_{22}$, $I_{23}$ and $I_{24}$ are expressed by the following equations (15) through (18):

$I_{21} = AA_0 \sin(\phi_2 - \phi_1) = I_{14}$ (15)

$I_{22} = -AA_0 \sin(\phi_2 - \phi_1) = I_{13}$ (16)

$I_{23} = AA_0 \cos(\phi_2 - \phi_1) = I_{11}$ (17)

$I_{24} = -AA_0 \cos(\phi_2 - \phi_1) = I_{12}$ (18)

Similarly to the first gain-variable amplifier 52, the second gain-variable amplifier 62 is for amplifying the second homodyne signal $H_2$ at a gain variably set by the gain adjusting circuit 80. The amplifier 62 supplies the amplified signal $H_2$ to two amplifiers 63 and 64. The amplifier 63 is for maintaining the polarity of the amplified signal $H_2$ and for producing a polarity-maintained second homodyne signal $H_{21}$. The signal $H_{21}$ is therefore comprised of the pulses of amplified pulse heights $I_{21}$, $I_{22}$, $I_{23}$, and $I_{24}$. The amplifier 63 supplies the signal $H_{21}$ to both the phase detecting circuit 70 and the gain adjusting circuit 80. The amplifier 64 is for reversing the polarity of the amplified signal $H_2$ and for producing a polarity-reversed second homodyne signal $H_{22}$. The signal $H_{22}$ is comprised of the pulses of amplified pulse heights $-I_{21}$, $-I_{22}$, $-I_{23}$, and $-I_{24}$. The amplifier 64 supplies the signal $H_{22}$ to both the phase detecting circuit 70 and the gain adjusting circuit 80.

The phase detecting circuit 70 is for receiving all the signals $H_{11}$, $H_{21}$, $H_{12}$, and $H_{22}$ and for obtaining information on the phase $\beta$ of the detection signal $M_0$. The gain adjusting circuit 80 is also for receiving all the signals $H_{11}$, $H_{21}$, $H_{12}$, and $H_{22}$ and for obtaining information on pulse heights of the temporal mean values of the intensities of the first and second interference signals.

The gain adjusting circuit 80 includes a second switch 81, a first integrator 82, a comparator 84, and an electric voltage source 83. The second switch 81 is connected to the amplifiers 53, 54, 63 and 64 and the oscillator 25 for receiving the signals $H_{11}$, $H_{12}$, $H_{21}$, and $H_{22}$ and the switch signal $S_0$. In response to the switch signal $S_0$, i.e., at every time of T, the second switch 81 selects one of the signals $H_{11}$, $H_{12}$, $H_{21}$, and $H_{22}$ that has a negative polarity and that has a phase shifted from that of the driving signal $D_0$ by the amount of 0 or $\pi$. Because the signals $H_1$ and $H_2$ are comprised of the amplified pulses $I_{11}$, $I_{12}$, $I_{13}$, and $I_{14}$ and amplified pulses $I_{21}$, $I_{22}$, $I_{23}$, and $I_{24}$ as shown in FIG. 3, the second switch 81 selects a successive series of amplified pulses of $I_{11}$, $-I_{12}$, $I_{23}$, and $-I_{24}$. The second switch 81 supplies the selected signals to the first integrator 82.

The first integrator 82 is for integrating the supplied signals into a direct current signal (referred to as a gain signal $G_0$) and for supplying the gain signal $G_0$ to the comparator 84. The gain signal $G_0$ has therefore an amplified value of $I_{11} - I_{12} + I_{23} - I_{24}$. The electric voltage source 83 is for supplying a predetermined reference voltage $B_0$ to the comparator 84. The comparator 84 is for comparing the signal $G_0$ with the reference voltage $B_0$, and for generating first and second control signals $C_1$ and $C_2$, each having a level proportional to the ratio of $G_0$ to $B_0$ ($=G_0/B_0$). The comparator 84 outputs the signals $C_1$ and $C_2$ to the optical detector 40 and the first and second gain-variable amplifiers 52 and 62, respectively. The signals $C_1$ and $C_2$ are for controlling the gains of the optical detector 40 and the amplifiers 52 and 62 so as to feed-back control the value of the signal $G_0$, i.e., the amplified value of the value $I_{11}-I_{12}+I_{23}-I_{24}$ to be set to the fixed value $B_0$.

Because the values $I_{11}$, $-I_{12}$, $I_{23}$, and $-I_{24}$ are theoretically identical to $AA_0\cos(\phi_2-\phi_1)$, by adjusting the total value of them, $I_{11}-I_{12}+I_{23}-I_{24}$, it is possible to control the value $AA_0\cos(\phi_2-\phi_1)$ at a high signal-to-noise ratio. The gain adjusting circuit 80 can thus feed-back control the amplified value of $4AA_0\cos(\phi_2-\phi_1)$ to the value $B_0$ at high accuracy.

The phase detecting circuit 70 includes a third switch 71, a second integrator 72, and a linearity controlling circuit 73. The third switch 71 is connected to the amplifiers 53, 54, 63, and 64 and the oscillator 25 for receiving the signals $H_{11}$, $H_{12}$, $H_{21}$, and $H_{22}$ and the switch signal $S_0$. In response to the switch signal $S_0$, i.e., at every time of T, the third switch 71 selects one of the homodyne signals $H_{11}$, $H_{12}$, $H_{21}$, and $H_{22}$ that has a positive polarity and that has a phase shifted from the driving signal $D_0$ by the amount of $\pi/2$ or $3\pi/2$. The selected signal is therefore comprised of the series of amplified pulses of $I_{21}$, $-I_{22}$, $-I_{13}$, and $I_{14}$. The third switch 71 supplies the selected signals to the second integrator 72.

The second integrator 72 is for integrating the supplied signals into a direct current signal $F_0$ having an amplified value of $I_{21}-I_{22}-I_{13}+I_{14}$. Because the values $I_{21}$, $-I_{22}$, $-I_{13}$, and $I_{14}$ are theoretically identical to $AA_0\sin(\phi_2-\phi_1)$, it is possible to highly accurately measure the value of $AA_0\sin(\phi_2-\phi_1)$ through measuring the total value of them. The phase detecting circuit 70 therefore obtains the amplified value of $4AA_0\sin(\phi_2-\phi_1)$.

The integrator 72 supplies the integrated signal $F_0$, indicative of the amplified value of $4AA_0\sin(\phi_2-\phi_1)$, to the linearity controller 73, such as a microcomputer, which is controlled to produce a phase signal $E_0$ indicative of a value of $\tan^{-1}\{F_0/B_0\}$. Because the signals $F_0$ and $B_0$ have the amplified values of $4AA_0\sin(\phi_2-\phi_1)$ and $4AA_0\cos(\phi_2-\phi_1)$, the phase signal $E_0$ indicates the amount of $(\phi_2-\phi_1)$, as apparent from the following equation (19):

$$\phi_2-\phi_1 = \tan^{-1}\{4AA_0\sin(\phi_2-\phi_1)/4AA_0\cos(\phi_2-\phi_1)\} = \quad (19)$$
$$(I_{21}-I_{22}-I_{13}+I_{14})/(I_{11}-I_{12}+I_{23}-I_{24}) = F_0/B_0$$

The amount of $(\phi_2-\phi_1)$ is indicative of the phase difference between the detection signal $M_0$ and the reference signal $R_1$.

A calculating circuit 74, such as another microcomputer, is connected to the linearity controller 73 for receiving the phase signal $E_0$ and for calculating the phase shift amount $\beta$ based on the equation $\phi_2-\phi_1=\beta-\alpha$. The calculating circuit 74 further calculates the following formula (20) to obtain the sum L of the distance between the light source 30 and the target 10 and the distance between the target 10 and the optical detector 40:

$$L=\beta c/(2\pi f_0) \quad (20)$$

where c is the speed of the light.

With the above-described structure, the device 100 of the present embodiment operates as described below.

The signal generating circuit 20 supplies the light source 30 with the driving signal $D_0$ which has the frequency $f_0$ and which is time-divisionally modulated in phase into four states. The signal generating circuit 20 supplies the first and second homodyne processing circuits 50 and 60 with the first and second reference signals $R_1$ and $R_2$ which have the same frequency with the driving signal $D_0$. The signal generating circuit 20 also supplies the phase detecting circuit 70 and the gain adjusting circuit 80 with the switch signal $S_0$ in synchronization with the timing at which the phase of the driving signal $D_0$ changes.

The light source 30 emits the detection light $P_0$ which is serially modulated in phase in correspondence with the driving signal $D_0$. As indicated by the equations (1)–(4), the detection light $P_0$ is emitted from the light source 30 with a phase which is serially changed into $\phi_0$, $\phi_0+\pi$, $\phi_0+\pi/2$, and $\phi_0+\pi/2$. The detection light $P_0$ is scattered by and reflected off the target 10. The detection light $P_0$ then travels from the target 10 and arrives at the optical detector 40. At the optical detector, the detection light $P_0$ has a phase which is serially changed into $\phi_2$, $\phi_2+\pi$, $\phi_2+\pi/2$, and $\phi_2+\pi/2$ as indicated by the equations (7)–(10). As indicated by the equation (20), the phase difference $\beta$ ($=\phi_2-\phi_0$) between the phase of the detection light at the light source and the phase of the detection light at the optical detector corresponds to the distance L by which the detection light $P_0$ travels from the light source 30 to the optical detector 40 via the target 10. The optical detector 40 generates the detection signal $M_0$ which is phase-modulated in correspondence with the received detection light $P_0$, and outputs the detection signal $M_0$ to the first and second homodyne processing circuits 50 and 60.

In the homodyne processing circuits 50 and 60, the detection signal $M_0$ is superimposed with the first and second reference signals $R_1$ and $R_2$, thereby generating two homodyne signals $H_1$ and $H_2$. Polarity-maintained homodyne signals $H_{11}$ and $H_{21}$ and polarity-reversed homodyne signals $H_{12}$ and $H_{22}$ are obtained through maintaining and reversing the polarities of the interference signals. These homodyne signals are fed to both the phase detecting circuit 70 and the gain adjusting circuit 80. According to the homodyne technique, the temporal means of the intensities of the homodyne signals $H_1$ and $H_2$, i.e., the direct-current components of the homodyne signals correspond to the phase differences between the detection signal $M_0$ and the first and second reference signals $R_1$ and $R_2$, respectively. As the phase of the detection signal $M_0$ changes at each time T, the temporal means of the interference signal intensities change. In other words, the pulse heights of the homodyne signals $H_1$ and $H_2$ change synchronously with phase switch of the driving signal $D_0$.

Even when a low-frequency component is generated synchronously with the phase switch of the driving signal, the low-frequency component can be eliminated as described below. The driving signal $D_0$ added with the low-frequency component is applied to the light source 30. The detection light $P_0$ therefore includes the low-frequency component. While travelling, the detection light $P_0$ attenuates with the low-frequency component at a predetermined rate. Because the low-frequency component is originally very small relative to the driving signal $D_0$, and therefore very small relative to the detection light $P_0$, an amount of the low-frequency component received by the optical detector 40 is small enough to be ignored. Thus, the detection signal $M_0$, obtained by the optical detector 40, is free from the low-frequency component. The pulse heights of the homodyne signals $H_1$ and $H_2$ can therefore highly accurately represent the phase differences between the detection signal $M_0$ and the reference signals $R_1$ and $R_2$. The structures of the homodyne processing circuits 50 and 60 can be simplified and can be easily integrated into a single integrated circuit. The homodyne processing circuits can be produced inexpensively.

The first and second homodyne processing circuits 50 and 60 are operated in accordance with the first and second reference signals $R_1$ and $R_2$, which are out of phase by the amount of $\pi/2$. The homodyne processing circuits 50 and 60 therefore operate complementarily in time to continuously supply pulses of the homodyne signals to the integrators 82 and 72. The integrator 82 and 72 can be constantly supplied with the amplified pulses $I_{11}$, $-I_{12}$, $I_{23}$, and $-I_{24}$ and the amplified pulses $I_{21}$, $-I_{22}$, $-I_{13}$, and $I_{14}$, respectively. Accordingly, it becomes possible to lower the time constants of the integrators 72 and 82 and provide a high-response operation.

At every interval T in response to the switch signal $S_0$, the switch 81 supplies the integrator 82 with one of the homodyne signals $H_{11}$, $H_{21}$, $H_{12}$, and $H_{22}$ that has a negative polarity and that has a phase shifted from the driving signal $D_0$ by the amount of 0 or $\pi$. The integrator 82 integrates the supplied homodyne signals while completely eliminating high-frequency components from the homodyne signals. The integrator 82 therefore produces a gain signal $G_0$ indicative of an amplified value of $I_{11}-I_{12}+I_{23}-I_{24}$ which equals an amplified value of $4AA_0\cos(\phi_2-\phi_1)$. The comparator 84 then compares the amplified value of $I_{11}-I_{12}+I_{23}-I_{24}$ with the reference voltage $B_0$. The comparator 84 feed-back controls the gains of the optical detector 40 and of the homodyne processing circuits 50 and 60, based on the compared results. This gain control normalizes the pulse heights of the homodyne signals $H_1$ and $H_2$ that have phases shifted from the driving signal $D_0$ by the amount of 0 or $\pi$. This feed-back control can set the homodyne signals $H_1$ and $H_2$ free from various influences, such as influences from the attenuation of the detection light $P_0$ and influences from the reflection rate of the target 10.

At every interval T in response to the switch signal $S_0$, the phase detecting circuit 70 supplies the integrator 72 with one of the homodyne signals $H_{11}$, $H_{21}$, $H_{12}$, and $H_{22}$ that has a positive polarity and that has a phase shifted from the driving signal $D_0$ by the amount of $\pi/2$ or $3\pi/2$. The integrator 72 integrates the supplied homodyne signals while completely eliminating high-frequency components from the homodyne signals. The integrator 72 therefore produces an integrated signal $F_0$ indicative of an amplified value of $I_{21}-I_{12}-I_{13}+I_{14}$ which equals an amplified value of $4AA_0\sin(\phi_2-\phi_1)$. The linearity controller 73 receives the integrated signal $F_0$ and produces a phase signal $E_0$ indicative of a value of $\tan^{-1}\{F_0/B_0\}$ which equals the amount of $(\phi_2-\phi_1)$.

As apparent from the above, because the pulse heights of the homodyne signals that have phases shifted from the driving signal $D_0$ by the amount of 0 or $\pi$ are feed-back controlled to the fixed value, the phase difference $(\phi_2-\phi_1)$ can be obtained based on measurements of only those of the homodyne signals that have phases shifted from the driving signal $D_0$ by the amount of $\pi/2$ or $3\pi/2$. The calculating circuit 74 then calculates, with extreme high accuracy, the difference $\beta$ between the phase of the detection light $P_0$ as emitted from the light source and a phase of the detection light as received at the optical detector 40. Thus, the device of the present invention can measure with extreme high accuracy the distance to the target.

According to the present embodiment, in the homodyne circuit 50, all the constituent pulses $I_{11}$, $I_{12}$, $I_{13}$, and $I_{14}$ of the homodyne signal $H_1$ are fed through the same amplifiers 52–54. It is possible to maintain the accuracy in the ratio of the pulse heights $I_{11}$ and $I_{12}$ to the pulse heights $I_{13}$ and $I_{14}$, i.e., the accuracy in the phase shift amount $(\phi_2-\phi_1)$. Also in the homodyne circuit 60, all the constituent pulses $I_{21}$, $I_{22}$, $I_{23}$, and $I_{24}$ of the homodyne signal $H_2$ are fed through the same amplifiers 62–64. It is also possible to maintain the accuracy in the ratio of the pulse heights $I_{21}$ and $I_{22}$ to the pulse heights $I_{23}$ and $I_{24}$, i.e., the accuracy in the phase shift amount $(\phi_2-\phi_1)$.

According to the present embodiment, two homodyne circuits 50 and 60 are provided. The switch 81 selects the amplified pulses $I_{11}$ and $-I_{12}$ from the circuit 50 and the amplified pulses $I_{23}$ and $-I_{24}$ from the circuit 60. The integrator 82 integrates those pulses from the both circuits 50 and 60 to produce the signal $G_0$. Similarly, the switch 71 selects the amplified pulses $I_{21}$ and $-I_{22}$ from the circuit 60 and the amplified pulses $-I_{13}$ and $I_{14}$ from the circuit 50. The integrator 72 integrates those pulses from the both circuits 50 and 60 to produce the signal $F_0$. Even though the gains of the amplifiers 52 through 54 in the circuit 50 are little different from those of the amplifiers 62 through 64, the influences from the gain differences can be eliminated during the amplified pulses from both circuits 50 and 60 are summed.

It is noted that the gain controlling circuit 80 can be omitted. In this case, the homodyne processing circuit 60 can be omitted. The remaining one homodyne processing circuit 50 serially provides the homodyne signals $H_1$. The amplifiers 53 and 54 provide the amplified homodyne signals $H_{11}$ ($I_{11}, I_{12}, I_{13}, I_{14}$) and $H_{12}$ ($-I_{11}, -I_{12}, -I_{13}, -I_{14}$). At every interval T, the switch 71 selects the amplified pulses $I_{11}$, $-I_{12}$, $I_{13}$, and $-I_{14}$. The integrator 72 may be controlled to produce an integrated signal $F_1$, indicative of the amplified value of $I_{11}-I_{12}$, and another integrated signal $F_2$, indicative of the amplified value of $I_{13}-I_{14}$. The linearity controller may produce a signal indicative of the $\tan^{-1}\{F_2/F_1\}$.

The gain-variable amplifier can be constructed from an outside FET, thereby enlarging the dynamic range and increasing a range of the distance detectable by the device.

In the embodiment, the phase of the driving signal is changed into zero, $\pi$, $\pi/2$, and $3\pi/2$. However, the phase can be changed into other values.

In the embodiment, the driving signal for the light source is time-divisionally modulated into the four phase states. It is noted, however, that the theoretical values of the temporal mean values of the interference signals include only three variables: an amplitude of the detection signal; an amplitude of the reference signal; and a phase difference between the detection signal and the reference signal. Accordingly, the driving signal can be time-divisionally modulated in phase into only three phase states. Thus, according to the present invention, the driving signal should be time-divisionally modulated in phase into at least three phase states.

The linearity controller 73 and the calculating circuit 74 can be constructed from a single computer. That is, the equations (19) and (20) can be calculated by program controls achieved by the single microcomputer. The integrator 72 can also be constructed in the microcomputer. That is, the integrated function of the integrator 72 can also be achieved by the program control by the microcomputer. Similarly, the functions of the comparator 84, the voltage source 83, and the integrator 82 can be achieved by the program controls by the microcomputer.

As described above, according to the present invention, homodyne signals are serially generated in correspondence with the phase switching operation of the driving signal. Temporal means of the intensities of the homodyne signals are then measured. For example, the homodyne signals are serially supplied to the integrators, where the direct-current components, indicative of their temporal mean intensities, are extracted. The relationship, such as a ratio, between the thus serially-obtained direct-current components represents the information on the value β. By measuring the relationship between the direct-current components, it is possible to calculate the value β, and accordingly the distance L.

While the invention has been described in detail with reference to the specific embodiment thereof, it would be apparent to those skilled in the art that various changes and modifications may be made therein without departing from the spirit of the invention.

What is claimed is:

1. A device for optically measuring a distance to a target, comprising:

a signal generating circuit for generating a driving signal which is time-divisionally modulated in phase into at least three states and for generating an original reference signal having a frequency the same as the driving signal;

a light source for being driven by the driving signal to emit detection light which is time-divisionally modulated in phase in accordance with the driving signal;

an optical detector for receiving the detection light which has been emitted from the light source and scattered and reflected by the target and for generating a detection signal which is time-divisionally modulated in phase in accordance with the received detection light;

a homodyne processing circuit for superimposing the detection signal and the original reference signal to obtain an interference signal and for generating a homodyne signal indicative of a temporal mean value of intensity of the interference signal; and a phase detecting circuit for comparing pulse heights of the homodyne signal obtained synchronously with the switching operation of the phase of the driving signal, thereby calculating a phase difference between a phase of the detection light emitted from the light source and a phase of the detection light received at the optical detector.

2. A device of claim 1, wherein the signal generating circuit includes:

a first oscillator for generating the original reference signal;

three phase shifters for shifting the phase of the original reference signal, by the amounts of π, π/2, and 3 π/2, to thereby generate three phase-shifted original reference signals, respectively;

a second oscillator for oscillating a pulsed switch signal; and a first switch for successively selecting one of the first through fourth original reference signals, in response to the switch signal, to thereby produce the driving signal.

3. A device of claim 2, wherein the signal generating circuit further includes:

a first additional phase shifter for shifting the phase of the original reference signal by a predetermined reference phase to thereby generate a first reference signal, the predetermined reference phase corresponding to a predetermined range, within which the distance to the target falls; and a second additional phase shifter for shifting the phase of one of the three phase-shifted original reference signals by the predetermined reference phase to thereby generate a second reference signal;

wherein the homodyne processing circuit includes:

a first homodyne processing circuit for superimposing the detection signal with the first reference signal to obtain a first interference signal and for generating a first homodyne signal indicative of a temporal mean value of intensity of the first interference signal; and a second homodyne processing circuit for superimposing the detection signal with the second reference signal to obtain a second interference signal and for generating a second homodyne signal indicative of a temporal mean value of intensity of the second interference signal.

4. A device of claim 3, wherein the second additional phase shifter shifts the phase of one of the three phase-shifted original reference signal that is shifted in phase by π/2 from the original reference signal, by the predetermined reference phase to thereby generate the second reference signal.

5. A device of claim 3, wherein the first homodyne processing circuit includes:

a first multiplier for superimposing the detection signal with the first reference signal to thereby generate the first homodyne signal;

a first gain-variable amplifier for amplifying the first homodyne signal with a variably-set gain; and a pair of first amplifiers for maintaining and reversing the polarity of the first homodyne signal to generate a polarity-maintained first homodyne signal and a polarity-reversed first homodyne signal, respectively, and wherein the second homodyne processing circuit includes:

a second multiplier for superimposing the detection signal with the second reference signal to thereby generate the second homodyne signal;

a second gain-variable amplifier for amplifying the second homodyne signal with a variably-set gain; and a pair of second amplifiers for maintaining and reversing the polarity of the second homodyne signal to generate a polarity-maintained second homodyne signal and a polarity-reversed second homodyne signal, respectively.

6. A device of claim 1, further comprising a gain controlling circuit for comparing the homodyne signal with a predetermined reference voltage and for controlling the gains of both the optical detector and of the homodyne processing circuit, based on the compared result.

7. A device of claim 5, wherein the gain controlling circuit includes:

a second switch for successively selecting one of the polarity-maintained first and second homodyne signals and the polarity-reversed first and second homodyne signals, in response to the switch signal;

a first integrator for integrating the selected signals to produce a direct current signal;

a voltage source for generating the reference voltage; and a comparator for comparing the pulse height of the direct current signal with the reference voltage to thereby control the gains of the optical detector and of the first and second gain-variable amplifiers, based on the compared result.

8. A device of claim 7, wherein the phase detecting circuit comprises:

a third switch for successively selecting one of the polarity-maintained first and second homodyne signals and the polarity-reversed first and second homodyne signals, in response to the switch signal;

a second integrator for integrating the selected signals to produce a direct current signal; and a linearity controller for receiving the direct current signal and for producing a signal indicative of the phase difference.

9. A device for optically measuring a distance to a target, comprising:

a signal generating circuit for generating a driving signal, with its phase being serially changed into at least zero and $\pi/2$, and for generating an original reference signal having a frequency the same as the driving signal;

a light source for being driven by the driving signal to emit detection light, with its phase being serially changed into at least zero and $\pi/2$ in accordance with the driving signal;

an optical detector for receiving the detection light which has been emitted from the light source and scattered and reflected by the target and for generating a detection signal, with its phase being serially changed into at least $\beta$ and $\beta+\pi/2$ in accordance with the received detection light, where $\beta$ indicates the distance along which the detection light travels from the light source to the optical detector via the target;

a homodyne processing circuit for superimposing the detection signal and the original reference signal to obtain a homodyne interference signal with its direct-current component indicating a temporal mean value of intensity of the homodyne interference signal; and a distance measuring circuit for comparing values of the direct-current components of the homodyne interference signal synchronously with the switching operation of the phase of the driving signal, and for calculating, based on the compared result, the distance along which the detection light travels from the light source via the target to the optical detector, wherein the detection signal is comprised of a series of at least a first detection signal part having a phase of $\beta$ and a second detection signal part having a phase of $\pi/2+\beta$, the homodyne interference signal being comprised of a series of at least a first interference signal part, obtained from the first detection signal part and the original reference signal, and a second interference signal part, obtained from the second detection signal part and the original reference signal, and wherein the distance measuring circuit includes an integrator for integrating the first interference signal part to produce a first pulse signal indicative of a direct-current component of the first interference signal part and for integrating the second interference signal part to produce a second pulse signal indicative of a direct-current component of the second interference signal part, a ratio of the first pulse signal to the second pulse signal being indicative of the value $\beta$.

10. A device of claim 9, wherein the distance measuring circuit further includes means for calculating the ratio of the first pulse signal to the second pulse signal, which is indicative of the value $\beta$.

11. A device of claim 9, wherein the signal generating circuit is controlled to generate a driving signal of a phase of zero during a first duration, to generate a driving signal of a phase of $\pi/2$ during a second duration, and to be switched off during a third duration, the light source being driven to emit the detection light of zero phase, to emit the detection light of $\pi/2$ phase, and not to emit the detection light during the first through third durations, the optical detector generating the first detection signal part, the second detection signal part, and a third detection signal part during the first through third durations, the homodyne processing circuit producing the first interference signal part, the second interference signal part, and a third interference signal part during the first through third durations, wherein the integrator further integrates the third interference signal part to produce a third pulse signal indicative of a direct-current component of the third interference signal part, wherein the distance measuring circuit further includes means for calculating the difference between the first and third pulse signals, a ratio of the difference between the first and third pulse signals with regard to the second pulse signal indicating the value $\beta$.

12. A device of claim 9, wherein the signal generating circuit generates a driving signal, with its phase being serially changed into at least zero, $\pi/2$, and $\pi$, the light source emitting the detection light, with its phase being serially changed into at least zero, $\pi/2$, and $\pi$, the optical detector generating a detection signal which is comprised of a series of at least the first detection signal part, the second detection signal part, and a third detection signal part having a phase of $\pi+\beta$, the homodyne processing circuit producing the homodyne interference signal which is comprised of a series of at least the first interference signal part, the second interference signal part, and a third interference signal part obtained from the third detection signal part and the original reference signal, wherein the integrator further integrates the third interference signal part to produce a third pulse signal indicative of a direct-current component of the third interference signal part, wherein the distance measuring circuit further includes means for calculating the difference between the first and third pulse signals, a ratio of the difference between the first and third pulse signals with regard to the second pulse signal indicating the value $\beta$.

13. A device of claim 12, wherein the signal generating circuit generates a driving signal, with its phase being serially changed into zero, $\pi/2$, $\pi$, and 3 $\pi/2$, the light source emitting the detection light, with its phase being serially changed into zero, $\pi/2$, $\pi$, and 3 $\pi/2$, the optical detector generating a detection signal which is comprised of a series of the first detection signal part, the second detection signal part, the third detection signal part, and a fourth detection signal part having a phase of $\beta+3$ $\pi/2$, the homodyne processing circuit producing the homodyne interference signal which is comprised of a series of the first interference signal part, the second interference signal part, the third interference signal part, and a fourth interference signal part obtained from the fourth detection signal part and the original reference signal, wherein the integrator further integrates the fourth interference signal part to produce a fourth pulse signal indicative of a direct-current component of the fourth interference signal part, wherein the distance measuring circuit further includes means for calculating the difference between the second and fourth pulse signals, a ratio of the difference between the first and third pulse signals with regard to the difference between the second and fourth pulse signals indicating the value $\beta$.

14. A device of claim 13, wherein the homodyne processing circuit includes:

a multiplier for superimposing the detection signal with the original reference signal to produce the homodyne interference signal comprised of the first through fourth interference signal parts; and an amplifier for amplifying all the first through fourth interference signal parts of the homodyne interference signal with a single gain.

15. A device of claim 14, further comprising a gain control circuit for controlling the gain of the amplifier, the gain control circuit including:

means for comparing the difference between the first and third pulse signals with a fixed value; and feed-back control means for controlling the gain of the amplifier so as to control the difference between the first and third pulse signals to the fixed value, wherein the difference calculating means calculates the distance based on the difference between the second and fourth pulse signals.

16. A device for optically measuring a distance to a target, comprising:

a signal generating circuit for generating a driving signal, with its phase being serially changed into at least zero and $\pi/2$, and for generating an original reference signal having a frequency the same as the driving signal;

a light source for being driven by the driving signal to emit detection light, with its phase being serially changed into at least zero and $\pi/2$ in accordance with the driving signal;

an optical detector for receiving the detection light which has been emitted from the light source and scattered and reflected by the target and for generating a detection signal, with its phase being serially changed into at least $\beta$ and $\beta+\pi/2$ in accordance with the received detection light, where $\beta$ indicates the distance along which the detection light travels from the light source to the optical detector via the target;

a homodyne processing circuit for superimposing the detection signal and the original reference signal to obtain a homodyne interference signal with its direct-current component indicating a temporal mean value of intensity of the homodyne interference signal; and a distance measuring circuit for comparing values of the direct-current components of the homodyne interference signal synchronously with the switching operation of the phase of the driving signal, and for calculating, based on the compared result, the distance along which the detection light travels from the light source via the target to the optical detector, wherein the signal generating circuit further generates an additional original reference signal which is shifted from the original reference signal by an amount of $\pi/2$, the signal generating circuit generating driving signals of phases of zero, $\pi$, $\pi/2$, and $3\pi/2$ during first through fourth durations, the light source emitting the detection light of phases of zero, $\pi$, $\pi/2$, and $3\pi/2$ during the first through fourth durations, the optical detector generating first through fourth detection signals of phases of $\beta$, $\beta+\pi$, $\beta+\pi/2$, and $\beta+3\pi/2$ during the first through fourth durations, wherein the homodyne processing circuit includes:

a first homodyne processing circuit for superimposing the detection signals with the original reference signal to produce first through fourth interference signals during the first through fourth durations and for amplifying the interference signals with a single gain while selectively controlling the polarities of the interference signals;

a second homodyne processing circuit for superimposing the detection signals with the additional original reference signal to produce additional first through fourth interference signals during the first through fourth durations and for amplifying the interference signals with another single gain while selectively controlling the polarities of the interference signals, a first integrator for receiving the first and second interference signals and the additional third and fourth interference signals and for integrating the received signals to produce a first pulse signal indicative of the direct-current components of the received signals;

feed-back control means for controlling the gains of the first and second homodyne processing circuits so as to control the first pulse signal to have a fixed value; and a second integrator for receiving the additional first and second interference signals and the third and fourth interference signals and for integrating the received signals to produce a second pulse signal indicative of the direct-current components of the received signals, wherein the distance measuring circuit calculates the distance along which the detection light travels from the light source via the target to the optical detector, based on the second pulse signal.

* * * * *